United States Patent [19]
Philip et al.

[11] Patent Number: 5,493,435
[45] Date of Patent: Feb. 20, 1996

[54] OPTIC SWITCHING

[75] Inventors: Alexander S. Philip; Geoffrey Chopping, both of Dorset, England

[73] Assignee: GPT Limited, United Kingdom

[21] Appl. No.: 127,698

[22] Filed: Sep. 28, 1993

[30] Foreign Application Priority Data

Sep. 30, 1992 [GB] United Kingdom ............... 9220592

[51] Int. Cl.⁶ ................................. H04J 14/08
[52] U.S. Cl. .................. 319/139; 319/117; 319/168
[58] Field of Search ................. 359/117, 121, 359/128, 136, 137, 139, 164, 168, 178; 385/116–117, 124

[56] References Cited

U.S. PATENT DOCUMENTS 5,241,409  8/1993  Hill et al. ........................ 359/128
5,303,078  4/1994  Brackett et al. .................. 319/139

FOREIGN PATENT DOCUMENTS 0347903  12/1989  European Pat. Off. .

Primary Examiner—Leo H. Boudreau
Assistant Examiner—Knife-Michael Negash
Attorney, Agent, or Firm—Kirschstein et al.

[57] ABSTRACT

A broadband multiport coherent optic data switch comprises a passive optic combiner/splitter, a plurality of port units and a switch control unit connected thereto, each port unit having a coherent optic source tuned to a respective optic frequency, the output of each source carrying thereon control information, including control information received from the control unit, together with switched data, the outputs of the sources being combined and distributed to all of the plurality of port units.

8 Claims, 20 Drawing Sheets 8 x 8 PASSIVE OPTIC COMBINER SPLITTER (3 STAGE)

FIG.1

| | APPLICATIONS | | | | | |
|---|---|---|---|---|---|---|
| | OPTICAL DISTRIBUTION FRAME | OPTICAL CROSS-CONNECT | OPTICAL SERVICE SWITCH | OPTICAL SUBSCRIBER SWITCH | INTERNAL TV STUDIO OPTICAL SWITCH | TV BROADCAST DISTRIBUTION |
| SIGNALS CARRIED | ALL | ALL | ALL | ALL | STUDIO TV | BROADCAST TV |
| SWITCHING ACTIONS | CHURN RECONFIG | CHURN RECONFIG | FREQUENT | FREQUENT | FREQUENT | LOCAL SELECT |
| SUBSCRIBER SIGNALLING | NO | NO | YES | YES | NO | NO |
| DISTRIBUTED ARCHITECTURE | VERY | NO | NO | VERY | PARTIAL | VERY |
| COMPLETELY NON-BLOCKING | YES | YES | YES | YES | YES | YES |
| BIDIRECTIONAL ACCESS FIBRES | YES | YES | YES | YES | YES | YES |
| SIMPLEX/ DUPLEX | DUPLEX | DUPLEX/ SIMPLEX | DUPLEX/ SIMPLEX | DUPLEX/ SIMPLEX | DUPLEX/ SIMPLEX | SIMPLEX |

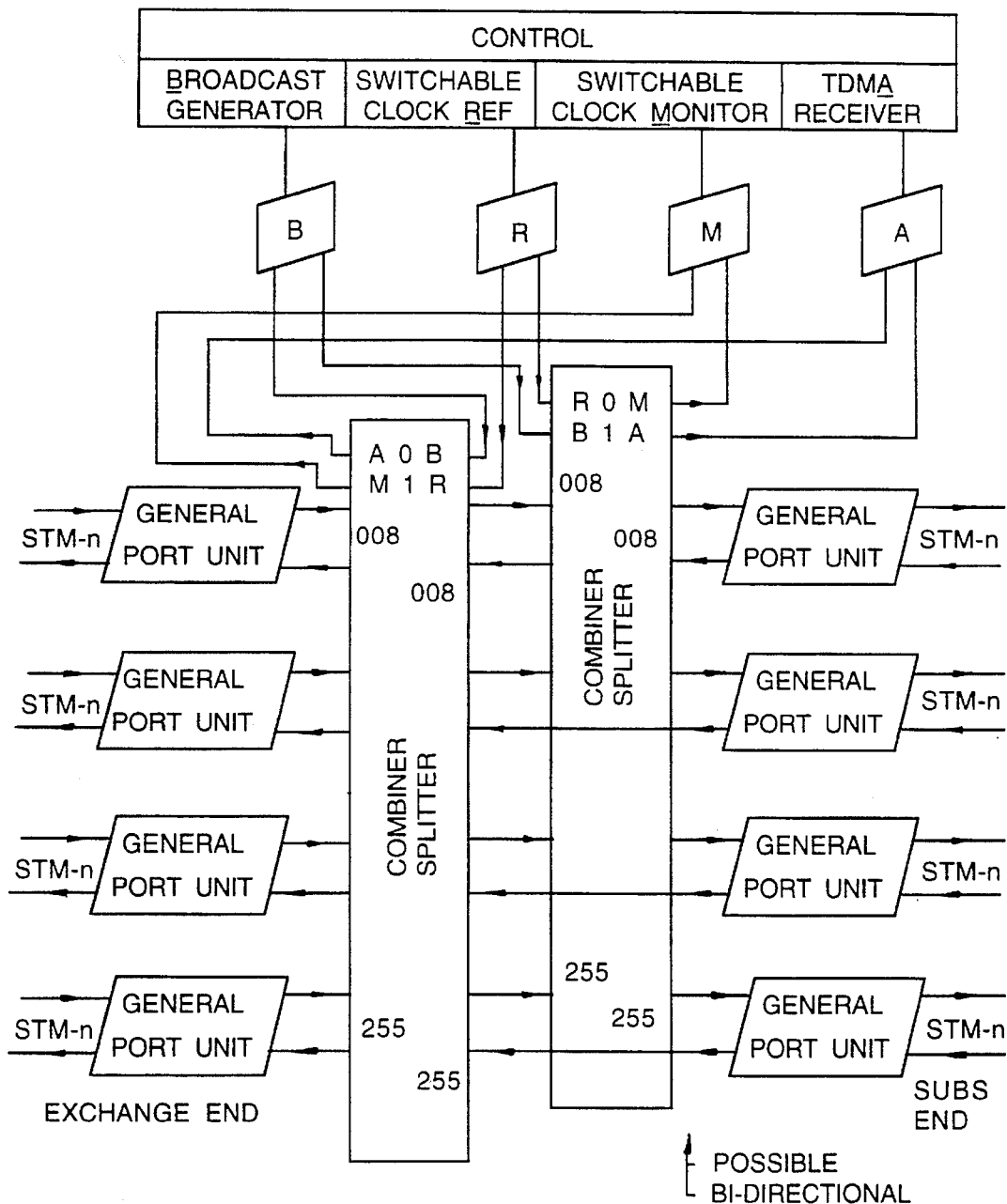

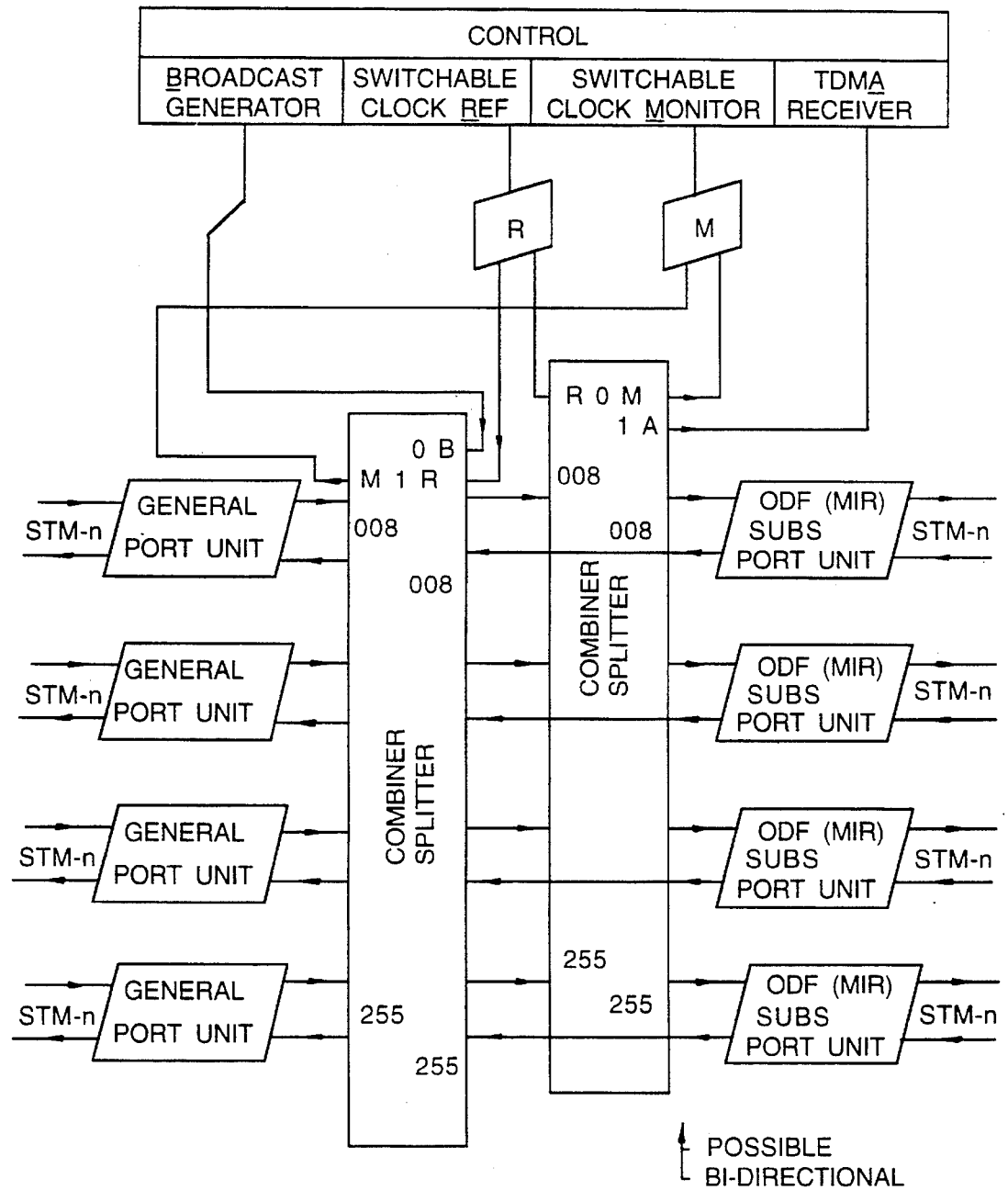

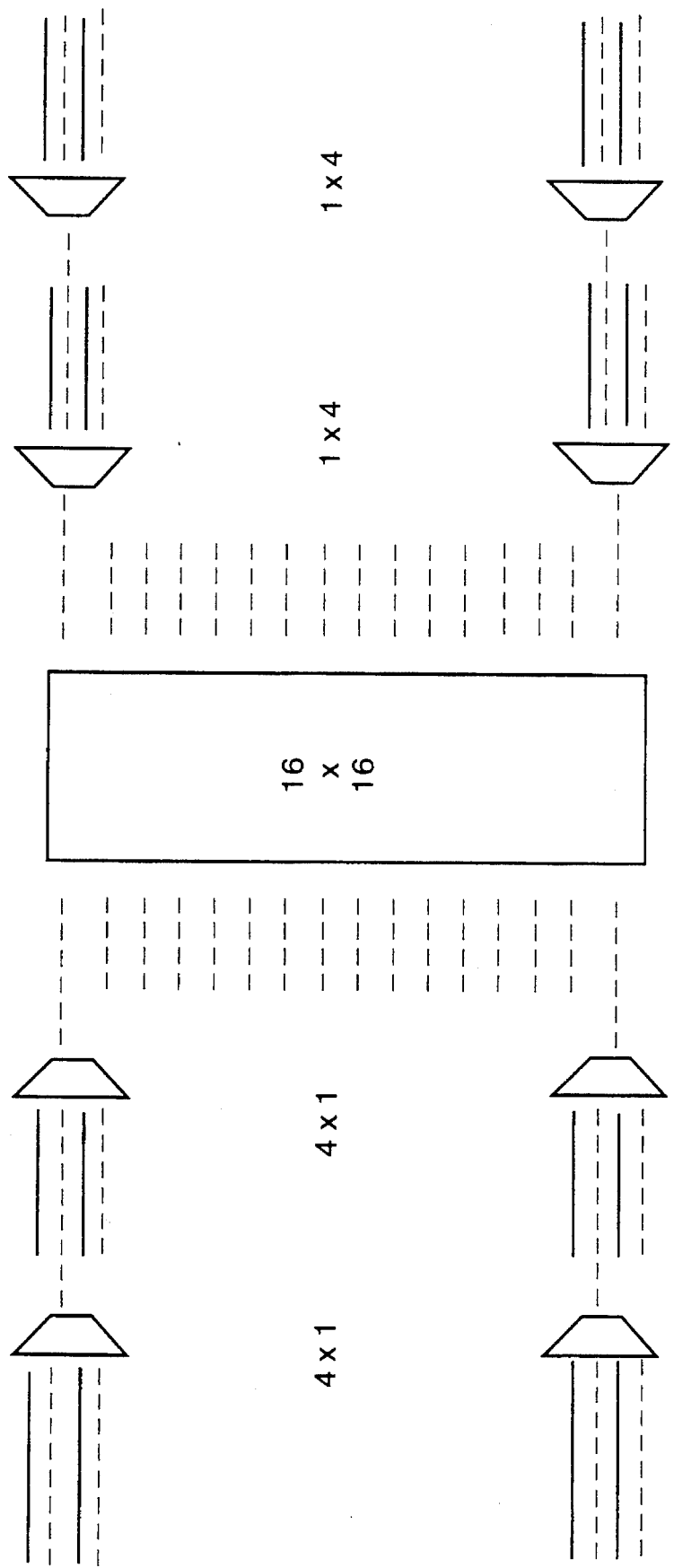

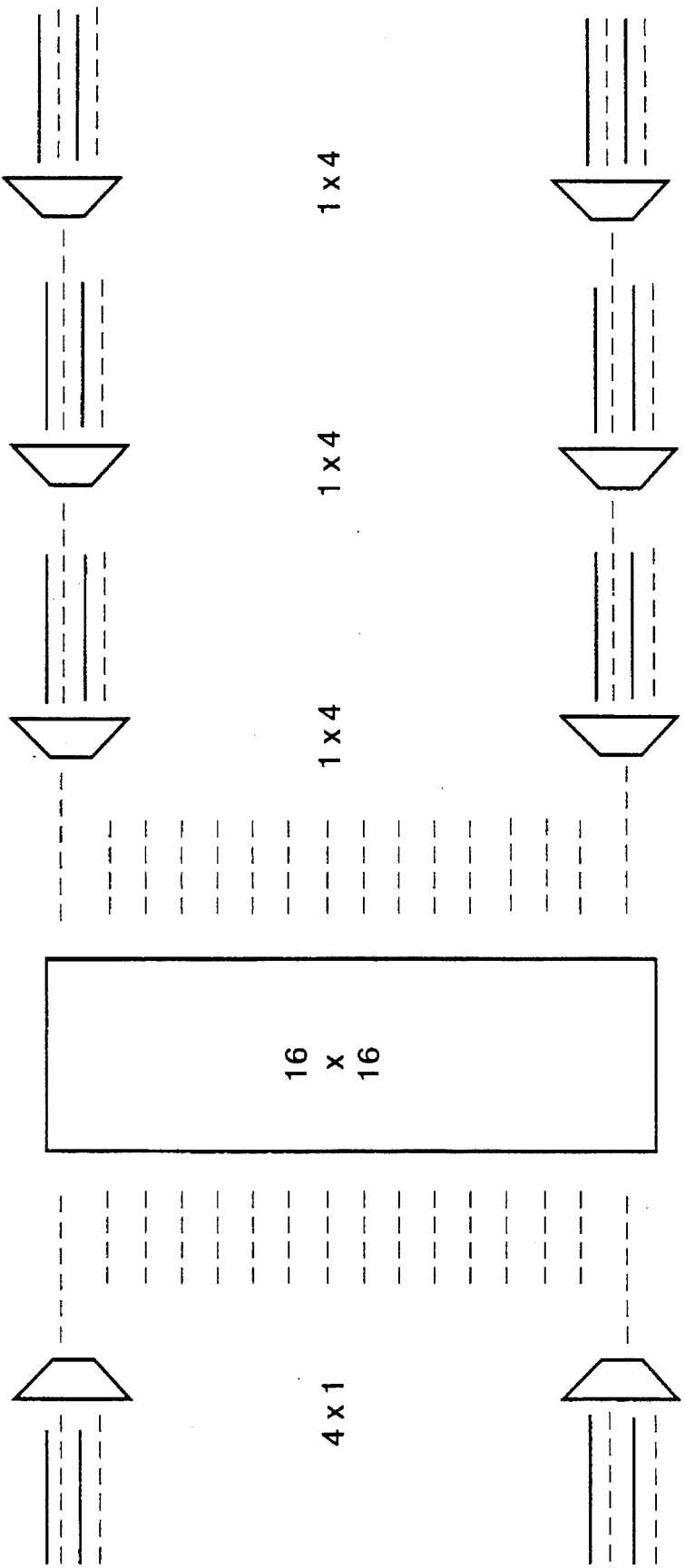

16 X 16 PASSIVE OPTIC COMBINER SPLITTER (4 STAGE)

8 x 8 PASSIVE OPTIC COMBINER SPLITTER (3 STAGE)

CLOSE CHANNEL SPACINGS  (DUPLEX)

GENERAL ARCHITECTURE
OPTICAL DISTRIBUTION FRAME (DIRECT) ARCHITECTURE
OPTICAL DISTRIBUTION FRAME (MIRROR) ARCHITECTURE

CLOSE SPACINGS - 1 REFERENCE POSITION PER TWO CHANNELS

OPTICAL DISTRIBUTION FRAME (MIRROR) SUBSCRIBER PORT UNIT

OPTIC OUTPUT IS 2 df FROM SUPPLIED REFERENCE.

NO BROADCAST RECEIVER,

NO TDMA SOURCE,

CONTROLLED BY MIRROR DATA,

STATUS RESPONSE VIA CHANNEL IDENTITY CODE TO EXCHANGE PORT UNIT.

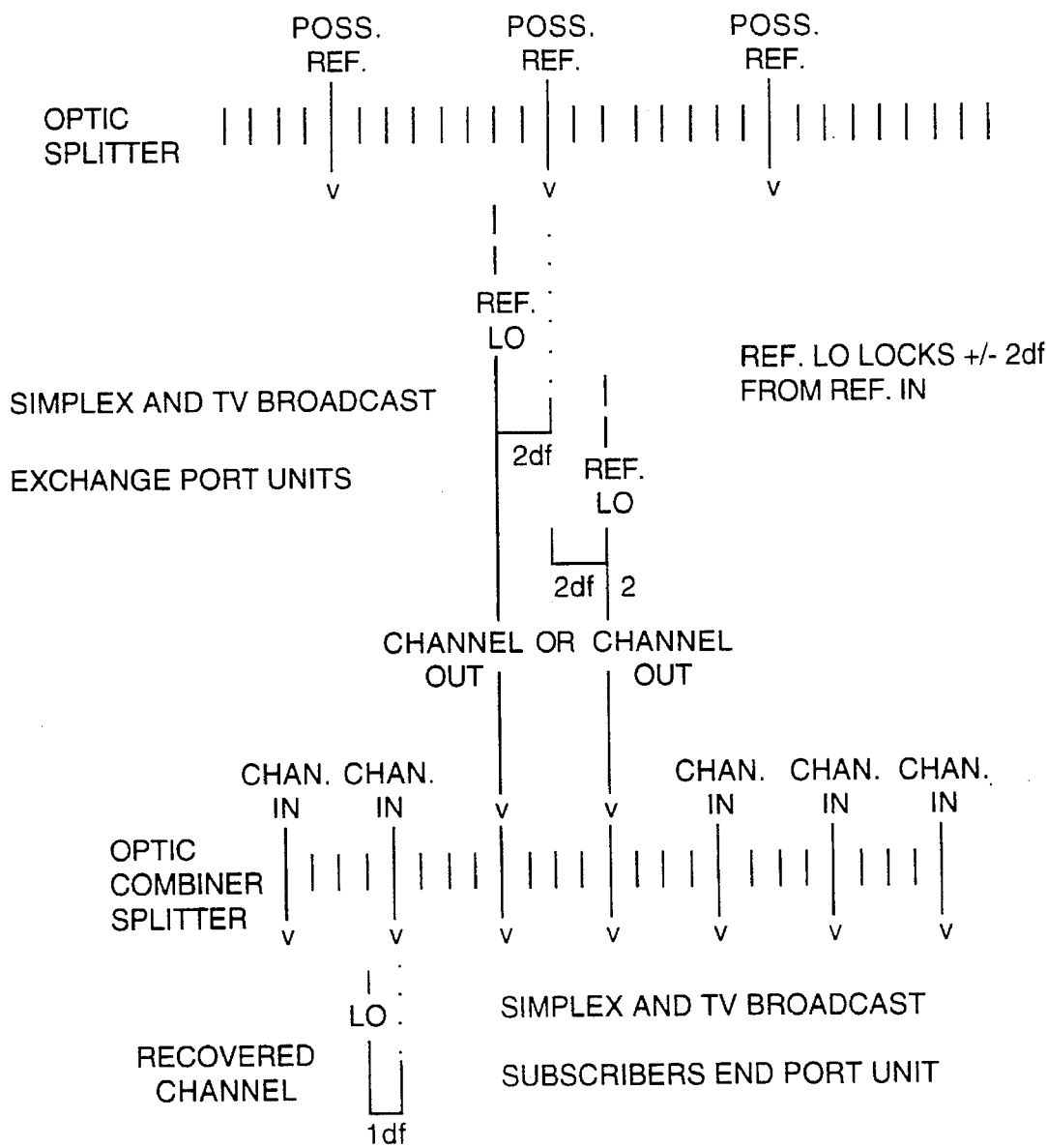

SIMPLEX AND TV BROADCAST EXCHANGE PORT UNIT

OPTIC OUTPUT IS 2 df FROM SUPPLIED REFERENCE.

NO COHERENT OPTIC DATA CHANNEL RECEIVER.

CONTROL UNIT FOR COHERENT BASED SYSTEMS

SWITCHABLE CLOCK REFERENCES

OPTIC SWITCHING

BACKGROUND OF THE INVENTION

Although the subject of Broadband has been around for a long time, many of the practical questions to how it could be deployed have not been fully addressed.

It may not be clear what broadband applications will finally emerge, but unless there is an effective means of physically providing Broadband connections through access networks, then broadband connections will not become very numerous.

SUMMARY OF THE INVENTION

According to the present invention there is provided a broadband multiport coherent optic data switch comprising a passive optic combiner/splitter, a plurality of port units and a switch control unit connected thereto, each port unit having a coherent optic source tuned to a respective optic frequency, the output of each source carrying thereon control information, including control information received from the control unit, together with switched data, the outputs of the sources being combined and distributed to all of the plurality of port units.

The switch may also comprise a further plurality of port units, the output, if any, of each source not carrying switched data.

Preferably each source includes control means to tune the source to a tuned switchable reference received from the switch control unit via the or a combiner/splitter or a combiner or a splitter.

BRIEF DESCRIPTION OF THE DRAWINGS

The present invention will now be described, by way of example, with reference to the accompanying drawings, in which:

FIG. 1 is a table of characteristics of applications in accordance with the present invention;

FIGS. 2B–2E show specific architectures;

FIGS. 2F–2I show examples of passive optic networks for the architectures of FIGS. 2B–2E;

FIGS. 3E and 3F show further examples of channel spacings;

DESCRIPTION OF THE PREFERRED EMBODIMENTS

Figure 2A:
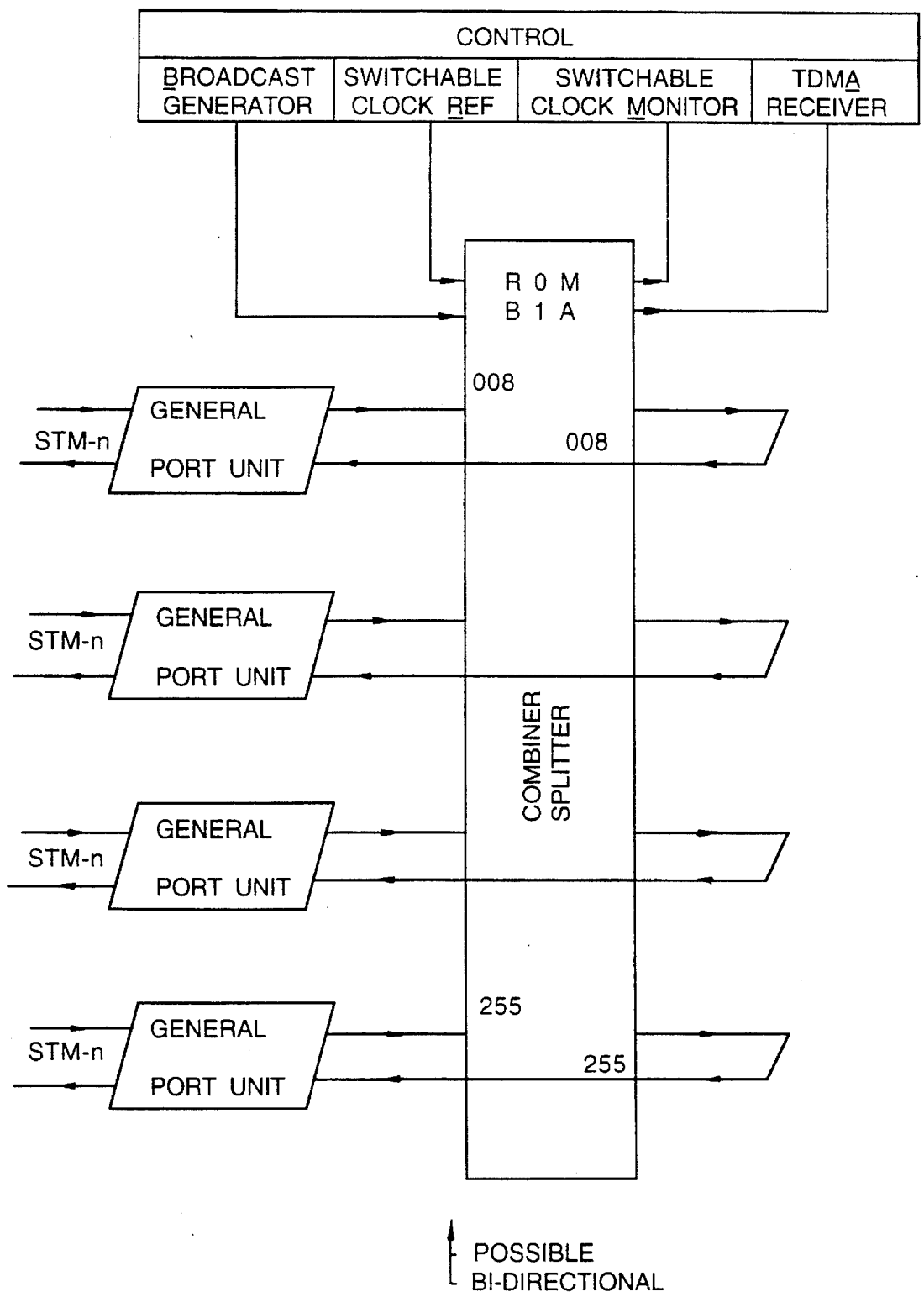
FIG. 2A shows a diagrammatic representation of the general architecture of an optic switch.

While the description generally refers to the use of lasers as the coherent optic source, it should not be considered as being limited only to lasers as the concept can be applied to the use of any tunable coherent optic source.

The final connection to the subscriber's equipment may be by an electrical interface, but the transport to the subscriber's site will normally be via optical means. It is assumed that the broadband transport medium for access and long haul transmission will be optic and therefore only optical transmission techniques are addressed.

It should also be noted that whereas electronic multiplexing allows thousands of low bandwidth channels to be time division multiplexed together, optic multiplexing, which uses the frequency domain, is much more complex and therefore expensive. It is therefore appropriate to use electronic time division multiplexing for low bit rate channels and only to use optic frequency division multiplexing of signals that either are naturally of high bit rate or are already high bit rate time division multiplexes.

Switches have to terminate interfaces. Different applications may have different interfaces and different termination requirements. The interface variations of the applications will not be explored, but purely the switching aspects of those applications.

There are several applications that would require broadband transport and these are summarised in FIG. 1.

If the business community is to use the proposed broadband services then a semi-permanent large bandwidth connection from the subscriber's premises to the exchange termination must be provided. This must carry a Business Multiplex. This is one multiplex carrying all the customers services.

A fairly permanent connection between TV studios or between TV studio and TV transmitter of studio quality signals would also have to be carried from the exchange to subscriber sites.

A likely bit rate for this application is the SDH carrier rate of 155.53 Mbit/s.

The Main Distribution Frame (MDF) is still an essential part of today's exchanges and moving copper pairs is much easier than moving optic connections. Consequently it is difficult to expect business multiplexes to be effectively distributed to the subscriber's premises without the optical equivalent of a Main Distribution Frame.

The use of passive optical networks to minimise the number of optic connections being back hauled to the exchange has many advantages over kerbside electronics.

The topology of the underground ducts tends to be laid out as tree and branch structures which normally prevent ring access arrangements.

An effective Optical Distribution Frame which is compatible with passive optical networks would offer considerable benefit to the broadband market.

The function of the ODF could be so transparent that the 155 Mbit/s interface of the subscriber unit thinks it is directly connected to the exchange termination, in the same way that System X is unaware of the MDF or any of the distribution points by the road side.

An ODF transparently connects subscriber terminations to exchange terminations on a semi-permanent basis.

Once inside the exchange, a business multiplex should be broken down and routed through to the appropriate low order crossconnects and service switches.

However some signals such as TV studio quality signals do not need breaking down and can be switched as individual circuits. Because of the high bit rates of these circuits, (155 Mbit/s) an optical switch could be considered for this application.

A crossconnect does not directly respond to subscriber signalling.

A crossconnect switches the payloads but not the Section Overheads (SOH) of an SDH carrier.

An optical crossconnect switches the single payload of an SDH carrier.

An optical crossconnect can reconfigure the single payload from each high bit rate interface.

If an optical crossconnect is made to respond to subscriber signalling, then it becomes an optical service switch.

An optical service switch can switch the single payload from each high bit rate interface under subscriber signalling.

This is an optical service switch which is directly connected to the subscribers equipment. Following a call attempt, a direct connection can be made between two subscriber's on the same Optical Subscriber Switch or between a subscriber and a trunk.

The Optical Subscriber Switch like the Optical Distribution Frame, has to be capable of being distributed over a considerable distance.

An Optical Subscriber Switch can switch one payload from each high bit rate subscriber or trunk interface under subscriber signalling.

All the video equipment in a television studio is connected together via one switch so that any output port can receive any input port signal, without any risk of blocking, and the decision of which channel is independently controlled by the output port.

The switch may be distributed around several buildings.

The number of inputs does not need to match the number of outputs, but for administration reasons it may have to. Output only ports could be considered.

The switch may not appear to need any central control, but some is necessary for simple architectures.

A TV Studio Switch allows any output to independently select any input.

This is inherently a unidirectional arrangement. It requires to be completely non blocking. There may be many times more output ports than input ports. Each output must be able to independently select any input. In order to ensure the sources of the video sources are operating satisfactorily some central administration is required.

A TV Distribution Studio Switch is a unidirectional switch which allows any output to independently select any input.

Several of these applications may require simplex operation, either with or without a control path in the reverse direction.

It may be a requirement to work over bi-directional access fibres.

All the following architectures are based on Coherent Optic transmission principles.

Later the principles of coherent optic switching will be described and details of the architectures given.

In order to provide the applications listed above, it is proposed that one basic architecture can be used which can be configured in several ways. Five variations are described. They have considerable commonality and the differences are mainly omitting functions that are not required for some applications.

The five variations are:

General;

Optical Distribution Frame (Direct);

Optical Distribution Frame (Mirror);

Simplex;

TV Broadcast.

These titles are to aid distinction rather than to precisely define the application.

Distributed Requirement

From FIG. 1, the need for distributed switches is apparent. All the architectures can be fully distributed.

This means that all the control mechanisms for both administration purposes and the important matter of channel stabilisation are conveyed through the optic interconnections.

1 GENERAL
DUPLEX OPTICS-DUPLEX CONTROL

Optical Crossconnect

Duplex Optical Service Switch

Duplex Optical Subscriber Switch

Internal TV Studio Optical Switch
 (Duplex ports)

Optical Distribution Frame

Duplex Control TV Broadcast Switch

2 OPTICAL DISTRIBUTION FRAME (DIRECT)
DUPLEX OPTICS-DUPLEX CONTROL

Optical Distribution Frame

3 OPTICAL DISTRIBUTION FRAME (MIRROR)
DUPLEX OPTICS-DUPLEX CONTROL

Optical Distribution Frame

4 SIMPLEX
SIMPLEX OPTICS-DUPLEX CONTROL

Simplex Optical Service Switch

Simplex Optical Subscriber Switch

Internal TV Studio Optical Switch
 (Centrally controlled Simplex ports)

Duplex Control TV Broadcast Switch

5 TV BROADCAST
SIMPLEX OPTICS-SIMPLEX CONTROL

Simplex TV Broadcast Distribution Switch

Internal TV Studio Optical Switch
 (Centrally controlled Simplex ports)

The general architecture can perform Optical Distribution Frame functions, but the optical distribution frame architectures can have twice the number of ports, because exchange to exchange and subscriber to subscriber connections are not required. This gives some useful improvements in the optical budget, but a wider laser tuning range is required.

The other differences are using much simpler port cards in the Simplex and TV Broadcast architectures, the central control and clock stabilisation methods being the same.

The General Architecture is shown with 256 ports each capable of 622 Mbit/s. The Optical Distribution Frames Architectures have 256 ports at each end and the others are shown as asymmetric. Several alternatives are possible.

There are methods for increasing the number of ports, such as lasers with a wider tuning range or using image rejection to pack the channels closer. These enhancements, which may cause other problems such as reducing the optical budget and tighter channel stablisation, have not been employed in these architectures. They can be considered for building larger switches in the future.

Figure 2D:
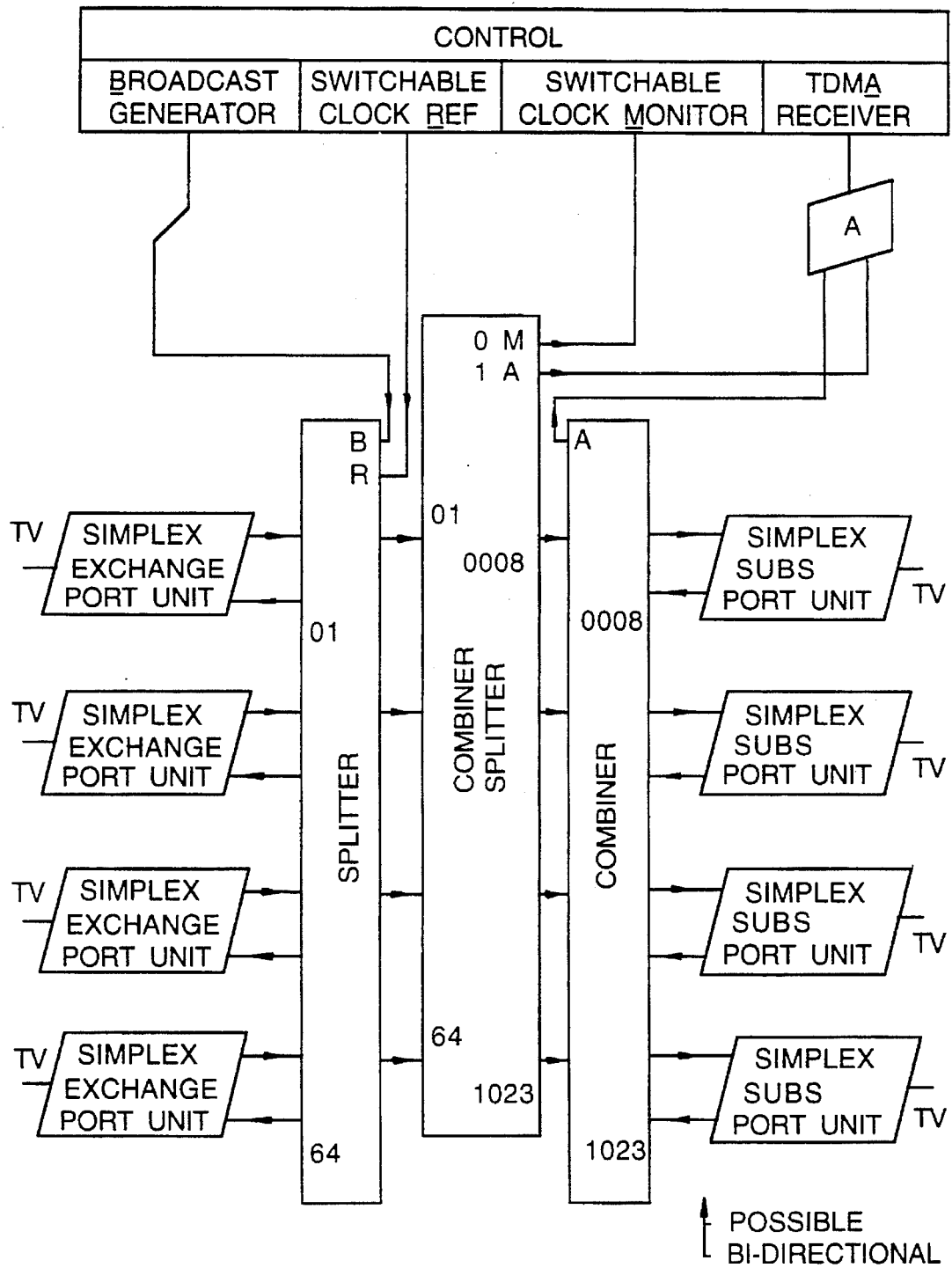

The passive optics used for a 256 port unit is shown in FIGS. 2D. It is a simple compromise between complexity and optical budget. Others could be used if more appropriate.

Figure 2E:
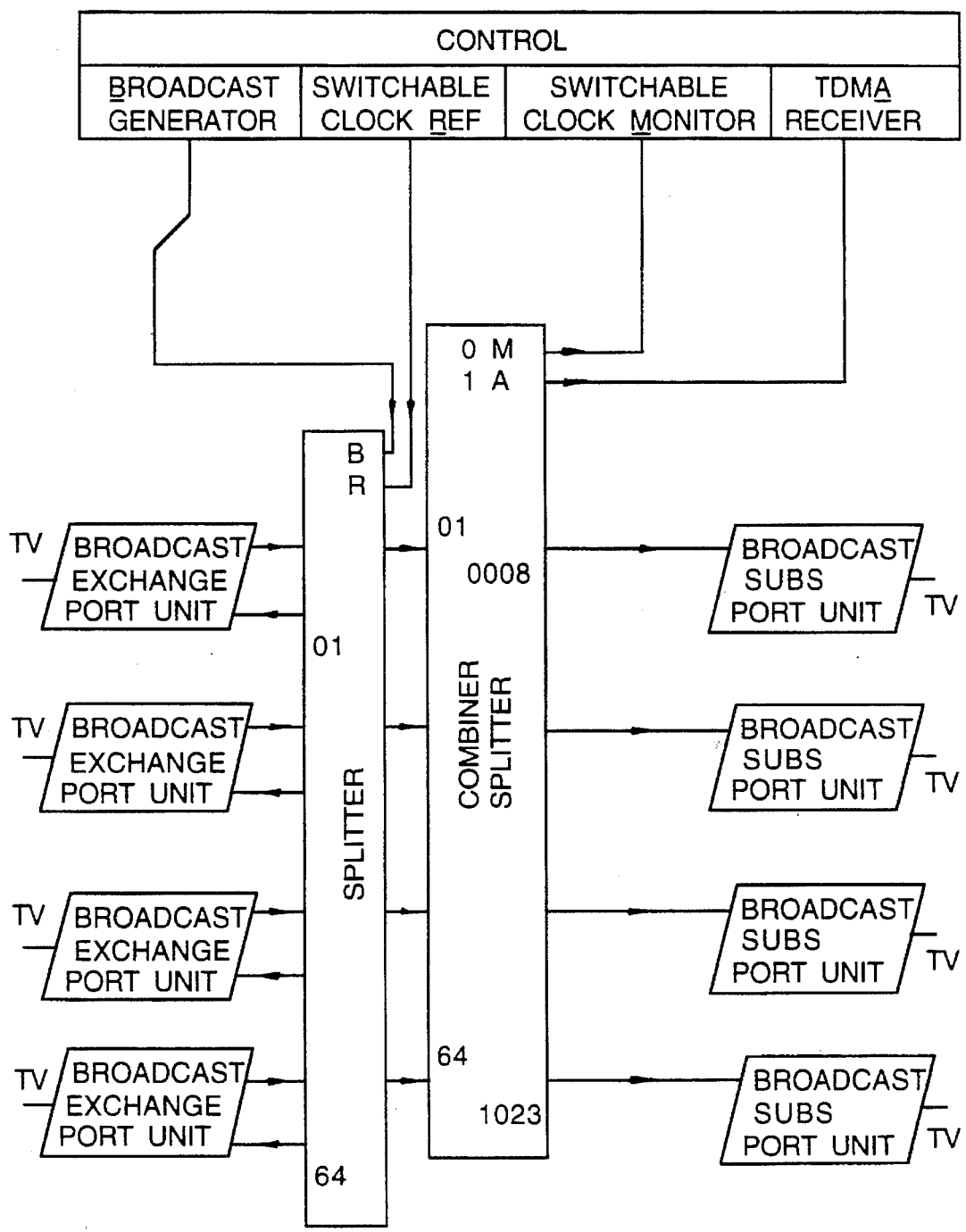
Figure 2H:
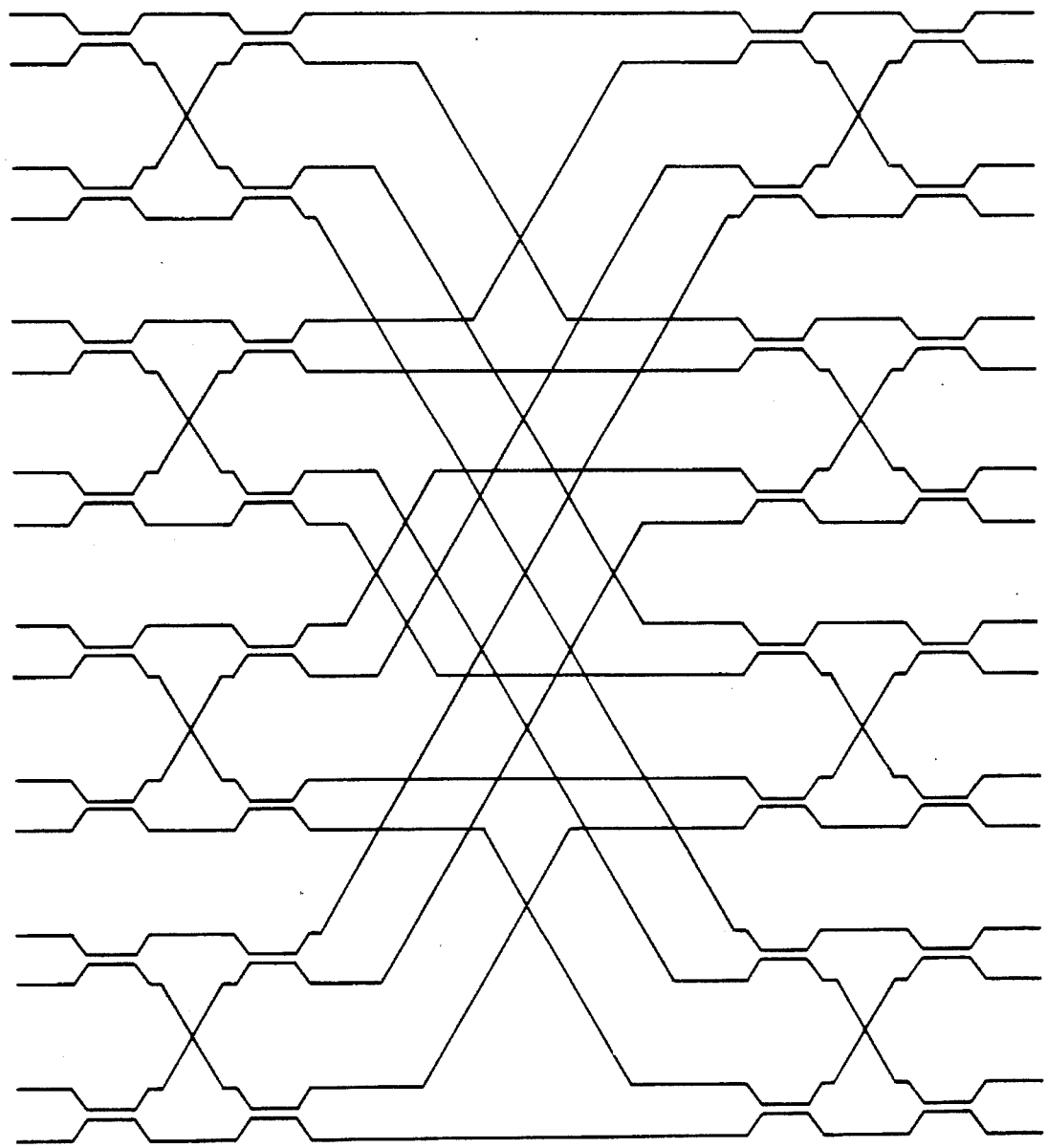
Figure 2I:
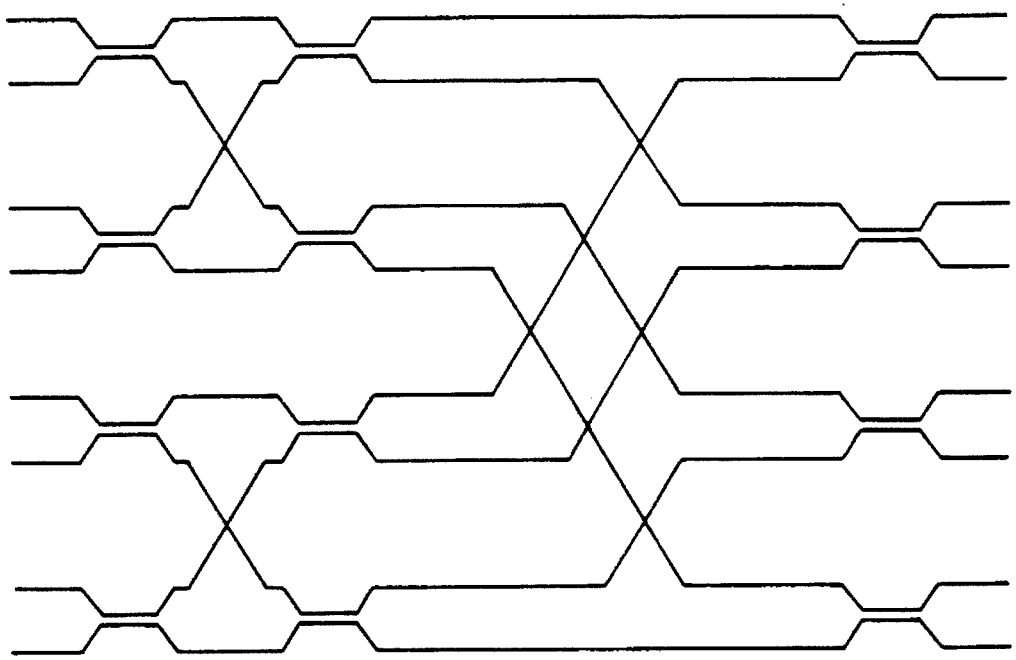

The architecture for the Broadcast arrangement, in FIG. 2E, shows a 64 to 1024 arrangement. Large switches are really only limited by optical budget which should still have something in hand.

By reducing to 155 Mbit/s; the optical budget is improved and the channel stabilisation and the laser tuning range become even less critical.

The architectures shown are unsecured. Complete duplication is possible. Various other methods are also mentioned where duplication of the passive optics may be considered as excessive.

Because these coherent optic switches transport the channel timing across the switch, multiple security plane switches would not be synchronised together. The only need for synchronisation would be for the Time Division Multiple Access (TDMA) mechanism. Because each channel has its own identity code and all the switch connections are broadcast to all ports, detecting faults should be much easier than on some switches.

Channel Stabilisation is the area where care is required.

All the port units on this switch are the same.

Each port unit has a laser source which must be held at a constant point in the optic frequency spectrum. Each source is modulated to contain not only the payload, but also a channel identity code.

Light from all these sources are combined and distributed to all the port units.

In order to perform a switching action a port unit tunes into the appropriate optic frequency.

The SWITCHABLE CLOCK REFERENCE is used when initially defining the source optic frequencies. Subsequent fine adjustments are performed by the SWITCHABLE CLOCK MONITOR measuring any drift and sending a message, via the BROADCAST GENERATOR, to the port card.

These and other control messages are sent to all port cards, with addresses to identify the port card. The BROADCAST GENERATOR also defines a Timing standard for the return TIME DIVISION.

The BROADCAST and TIME DIVISION MULTIPLE ACCESS information are both carried optically. Because low data rates are used and outband frequencies are used, there is only a small impact on the optical budget.

The BROADCAST information includes the current switch paths.

The SWITCHABLE CLOCK REFERENCE gives the appropriate frequency identity code for each frequency it supplies.

All source lasers have inhibits so they can be disabled if they are not on the correct optic frequency.

The architecture is arranged so it can work over bi-directional fibres if required.

This is shown in FIG. 2B.

There are two optic combiner/splitter units for this switch; one for each direction of traffic. This enables 256 exchange and 256 subscriber ports to be handled with the same optical budget as 256 ports on the General Architecture, provided the laser tuning range is wide enough.

The coherent channel spacings are shown and described with reference to FIGS. 3A and 3B.

Figure 3A:
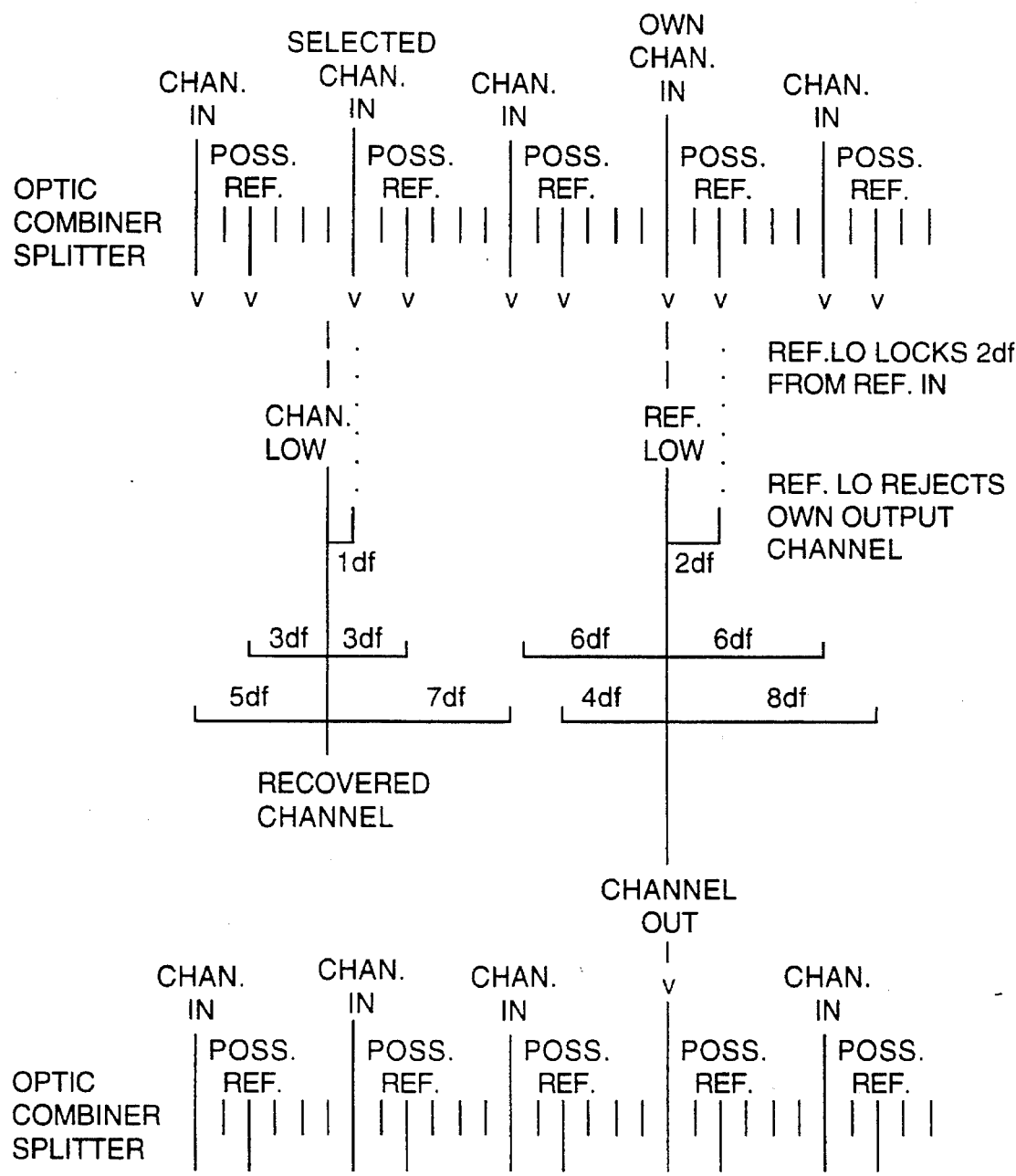
FIGS. 3A and 3B show examples of channel spacings.
Figure 3B:
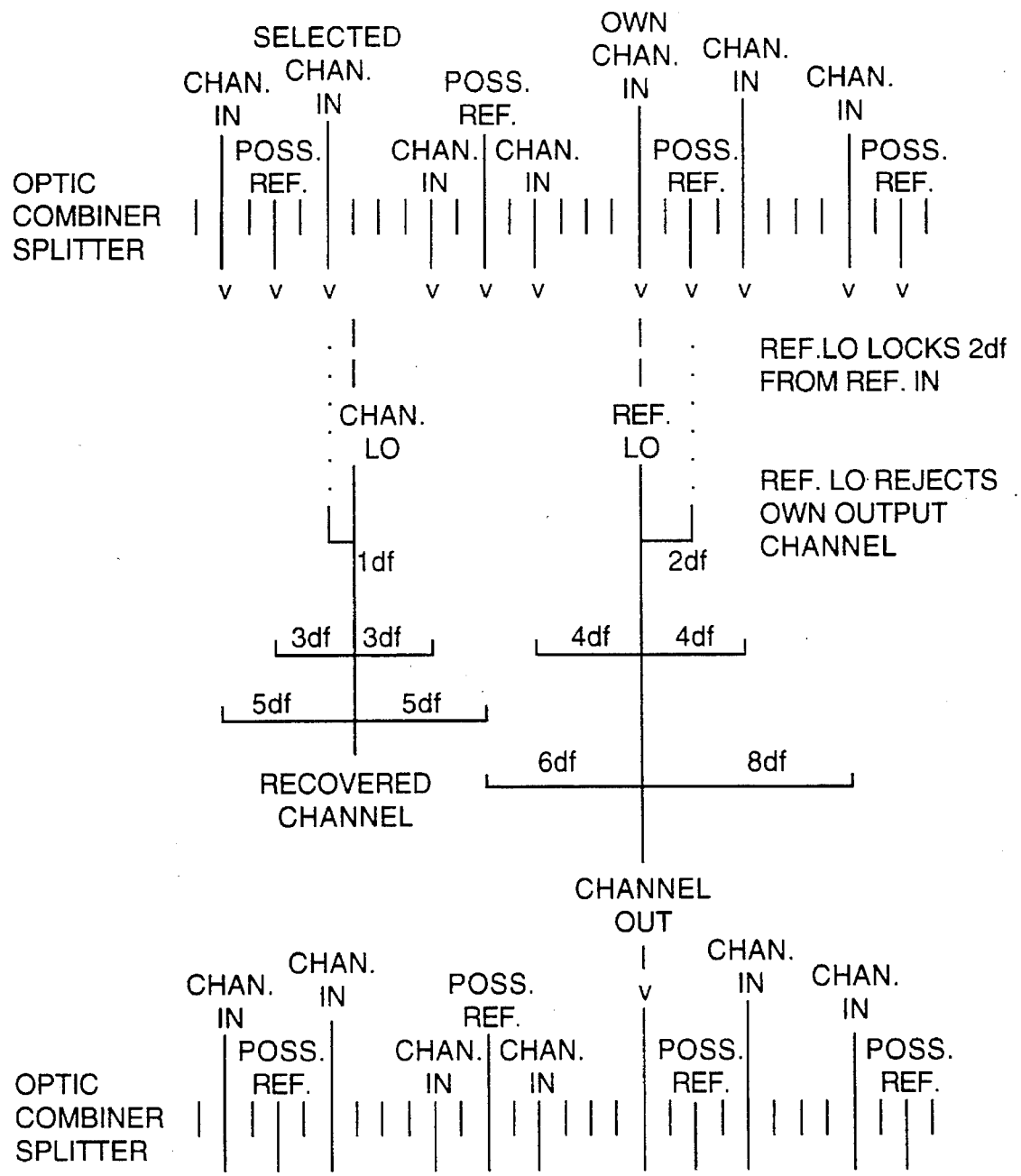
Figure 3C:
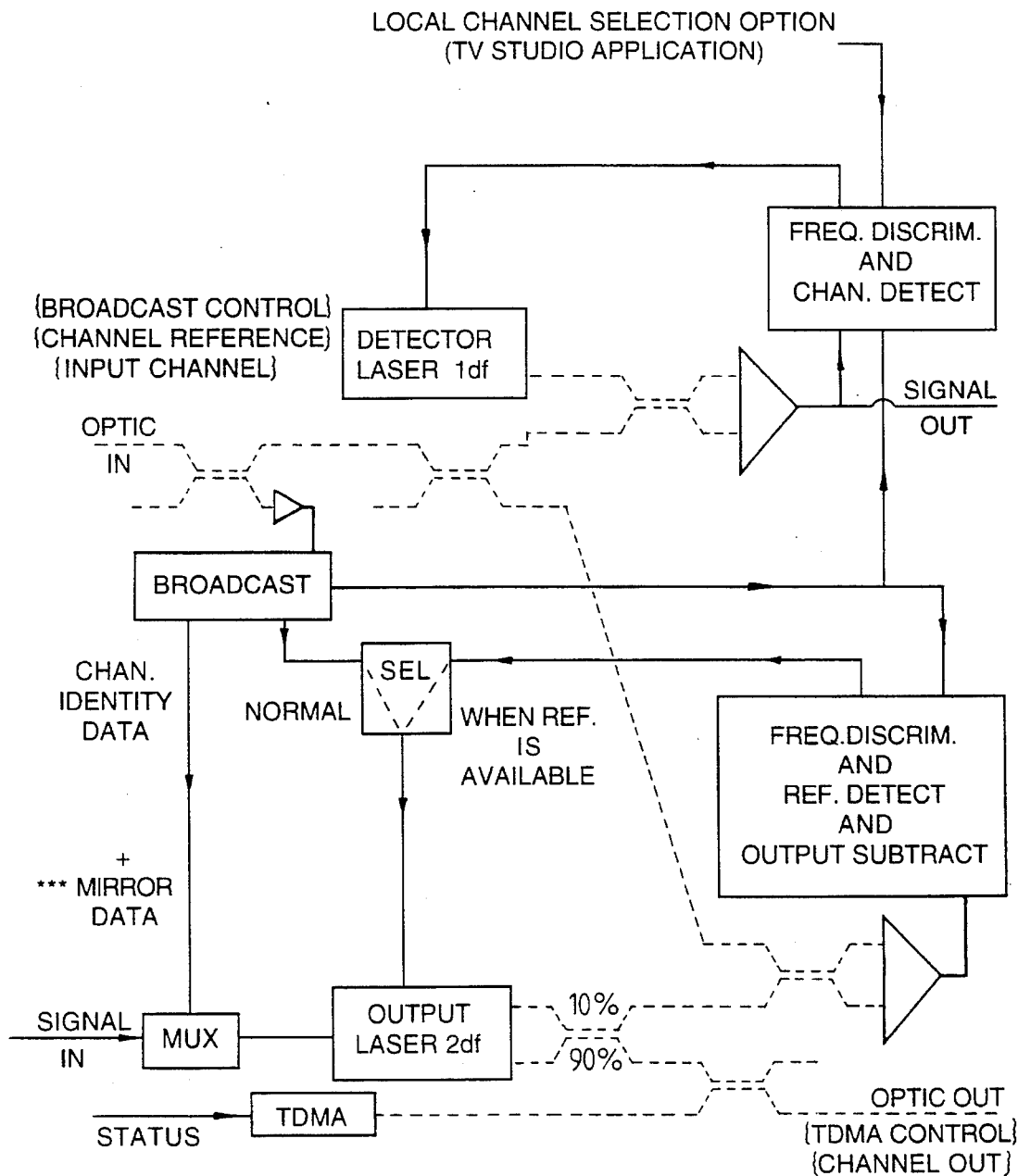
FIGS. 3C and 3D show examples of port units.

The port units on this architecture are the same as for the General Architecture (See FIG. 3C).

All ports units are also controlled in the same way by the use of the Switchable Clock Monitor, Switchable Clock Reference, Broadcast Generator and TDMA Receiver.

The central functions have to service twice as many port units as in the General Architecture. This can be achieved by providing extra units or by optically sharing one set.

This is shown in FIG. 2C.

There are two optic combiner/splitter units for this switch; one for each direction of traffic. This enables 256 exchange and 256 subscriber ports to be handled with a lower optical budget than 256 ports on the General Architecture, provided the laser tuning range is wide enough.

Again, the coherent channel spacings are shown and described with reference to FIGS. 3A and 3B.

There are two types of port units on this switch. Exchange Port units and Subscriber Port units. An Exchange Port unit services a Subscriber Port Unit via a duplex coherent optic connection.

The Exchange Port units as shown in FIG. 3C on this architecture are the same as for the general architecture. These port units are controlled in the same way by the use of the Switchable Clock Monitor, Switchable Clock Reference, Broadcast Generator and TDMA Receiver.

Part of the broadcast information contains the switch paths. These are mirrored forward by all the Exchange Port units to the Subscriber Port units along with the channel identity code information. By reading any optic channel, a Subscriber Port unit knows from which Exchange Port unit it should be receiving channel data.

Figure 3D:
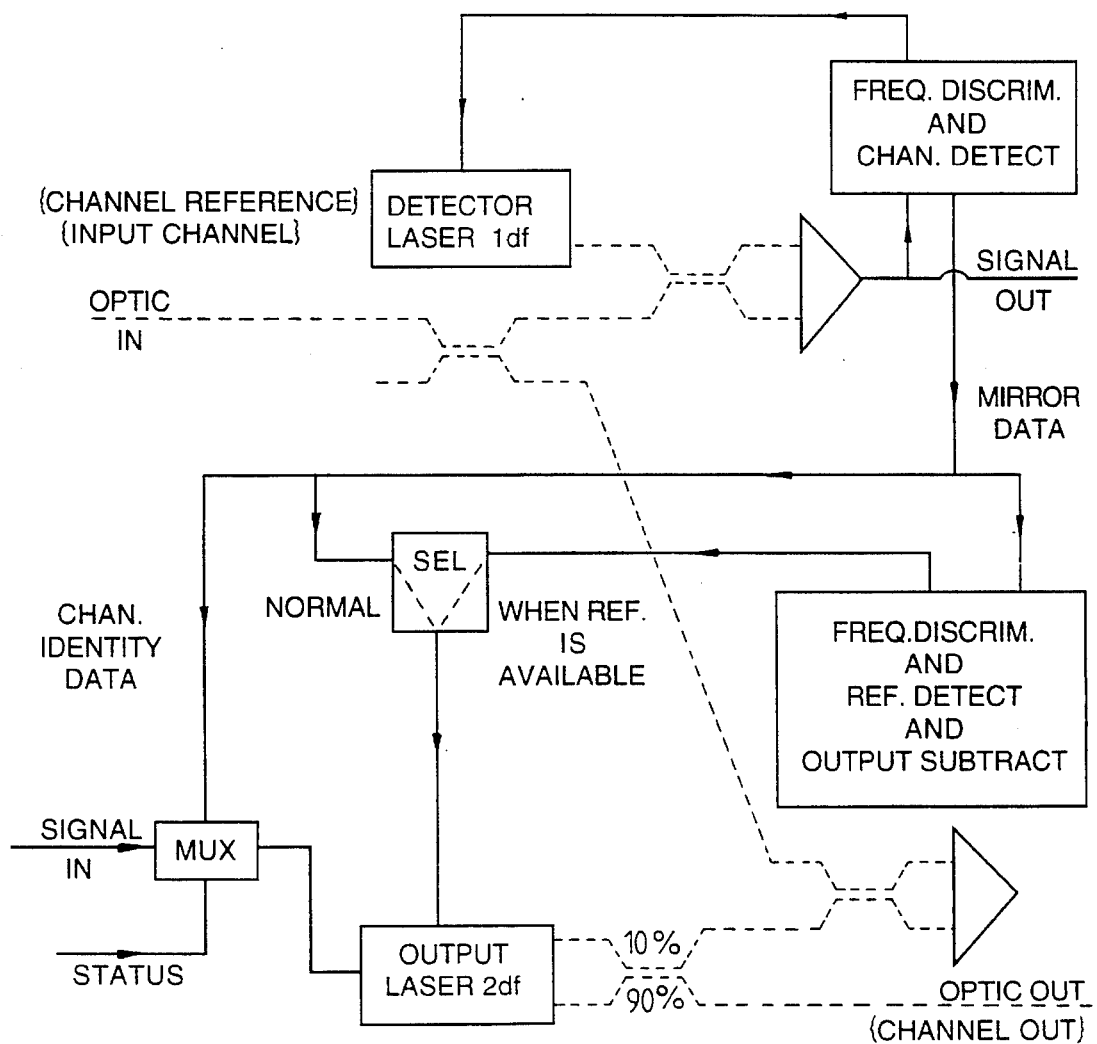

The Subscriber Port units as shown in FIG. 3D are the same as the Port Units for the General architecture except that the Broadcast and TDMA mechanisms are missing. This also allows two optical combiner/splitters to be omitted. The Subscriber Port Units receive references as normal and are monitored as normal, but all control messages are received from and sent to the exchange unit in the Mirror Channel.

The central functions have to service twice as many port units as the General Architecture. This can be achieved by providing extra units or by optically sharing one set.

This is shown in FIG. 2D.

There is one optic combiner/splitter unit, one 64 way splitter and one 1024 way optic combiner for this switch. They are respectively for; broadcasting the TV channels (or other unidirectional optical circuits), for distributing the optic frequencies and control, and for collecting Subscriber responses and signalling.

Figure 3E:
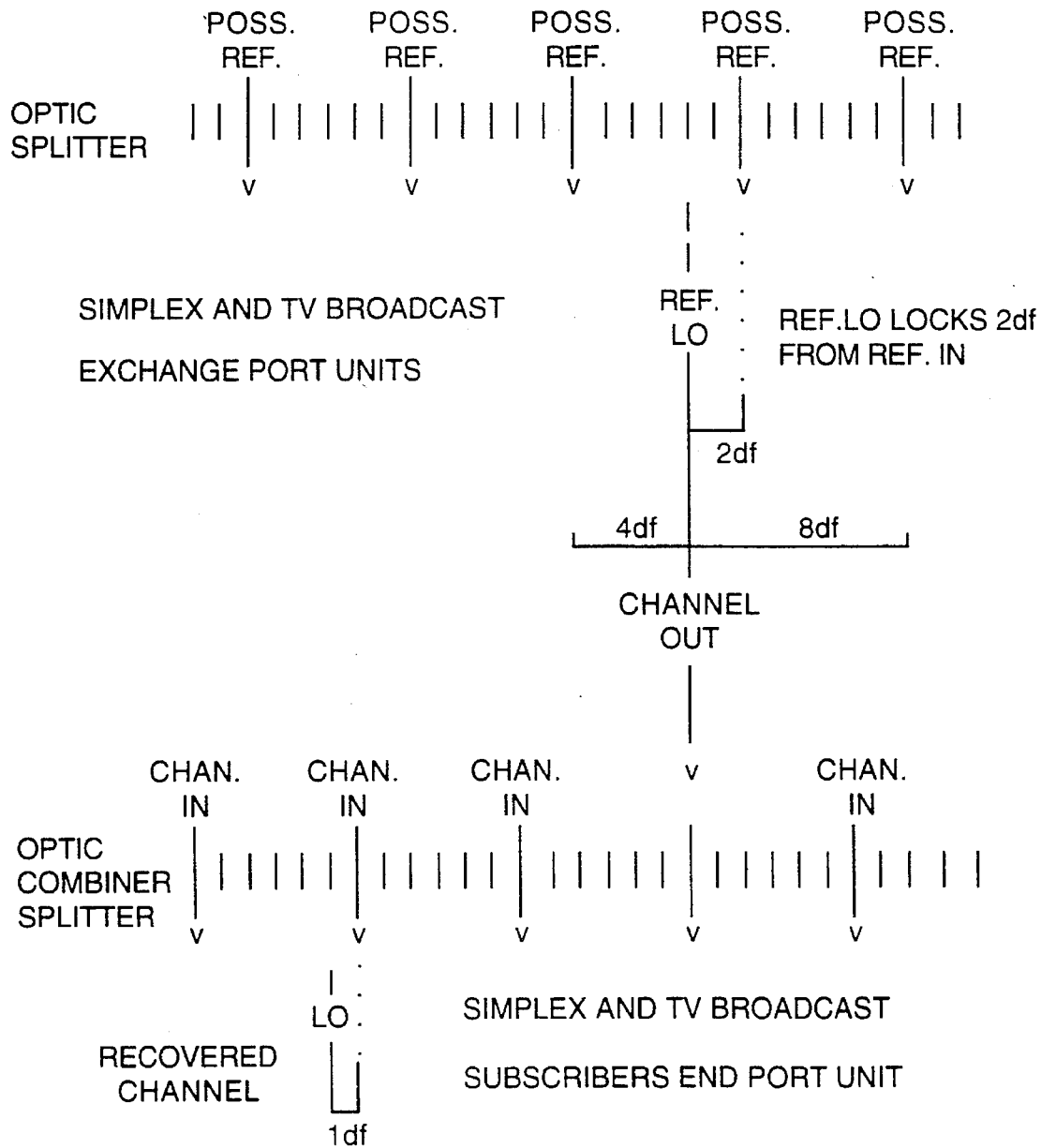

The coherent channel spacings are shown and described with reference to FIGS. 3E and 3F.

There are two types of port units on this switch. Exchange Port units and Subscriber Port units.

Figure 3G:
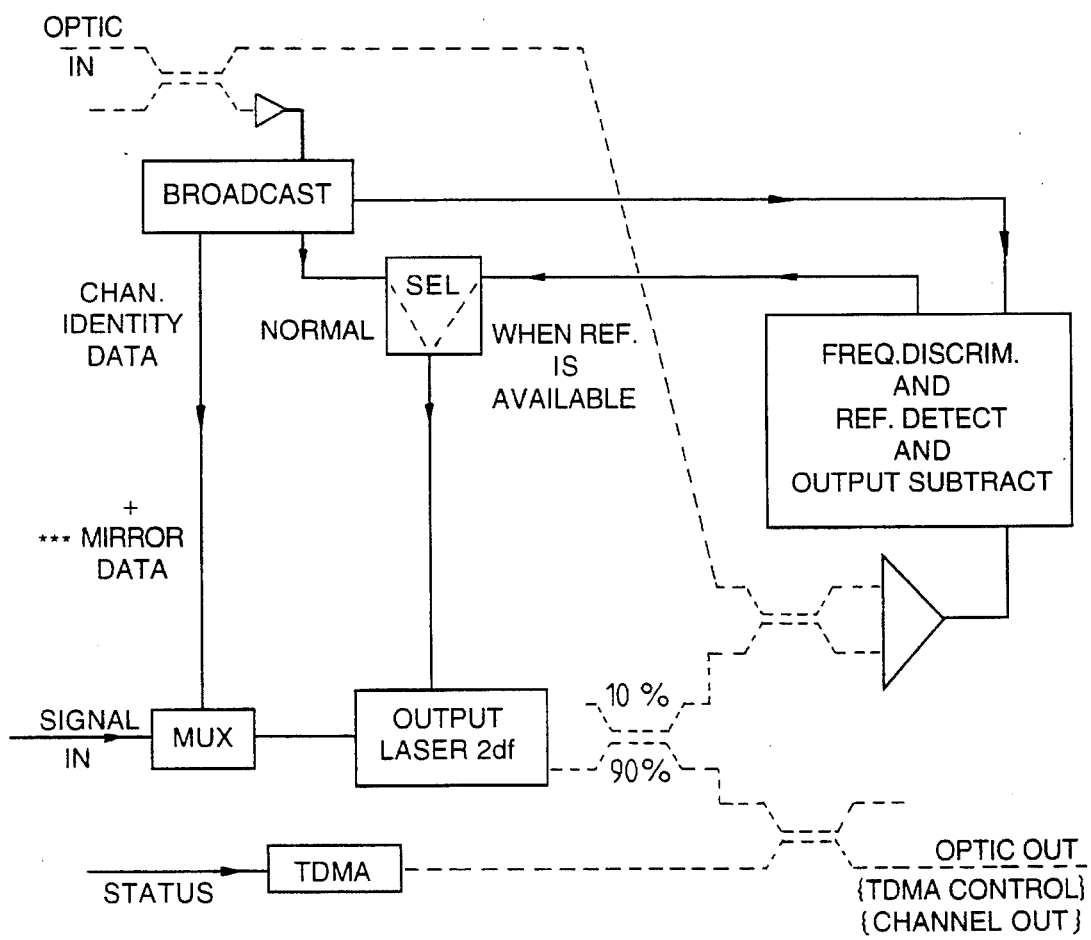
FIGS. 3G–3I show further examples of port units.
Figure 3H:
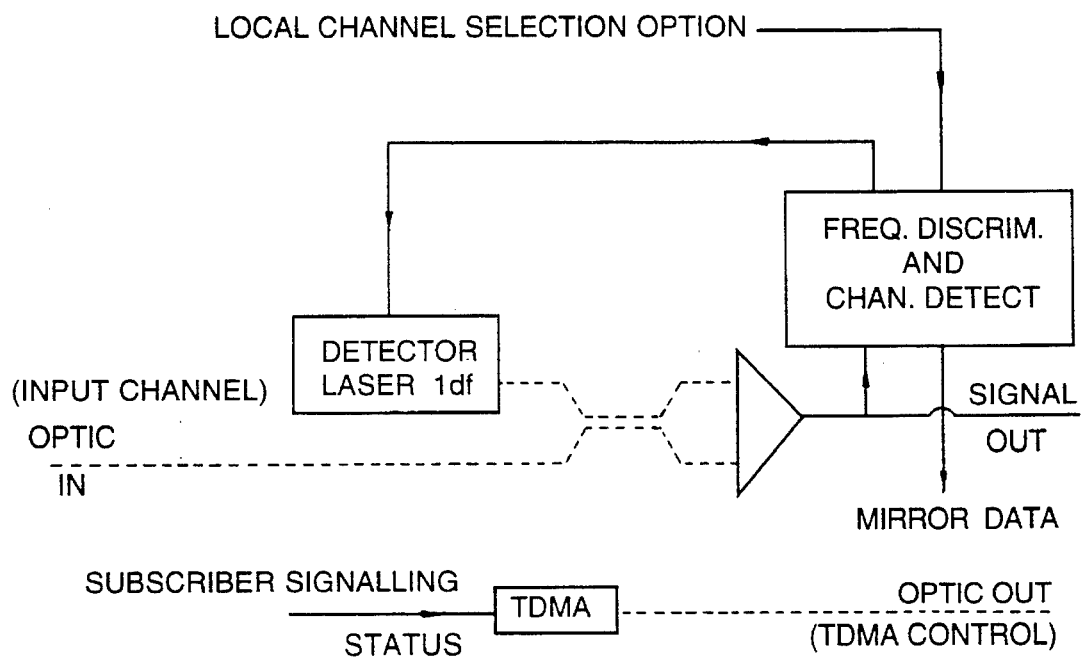

The Subscriber Port unit as shown in FIG. 3H controls its selection of all the distributed optical channels. It has no optical output port.

The Exchange Port units as shown in FIG. 3G can be simpler than the port units on the general switch, as there is no channel to detect from the subscriber. The Exchange Port units are still controlled in a similar way by the use of the Switchable Clock Monitor, Switchable Clock Reference, Broadcast Generator and TDMA Receiver.

The Subscriber Port units can be controlled, if required, by using the broadcast and mirror mechanisms to distribute the messages and the TDMA mechanisms for responses. This enables subscribers to request different TV programs to be transmitted.

This architecture still requires a return interface which will require more cabling and passive components than the Broadcast Only Architecture.

As shown in FIG. 2E, there is one optic combiner/splitter unit and one 64 way splitter for this switch; the former one for broadcasting the TV channels and the latter for distributing the optic frequences and control.

The coherent channel spacings are shown and described with reference to FIGS. 3E and 3F.

There are two types of port units on this switch. Exchange Port units and Subscriber Port units.

Figure 3I:
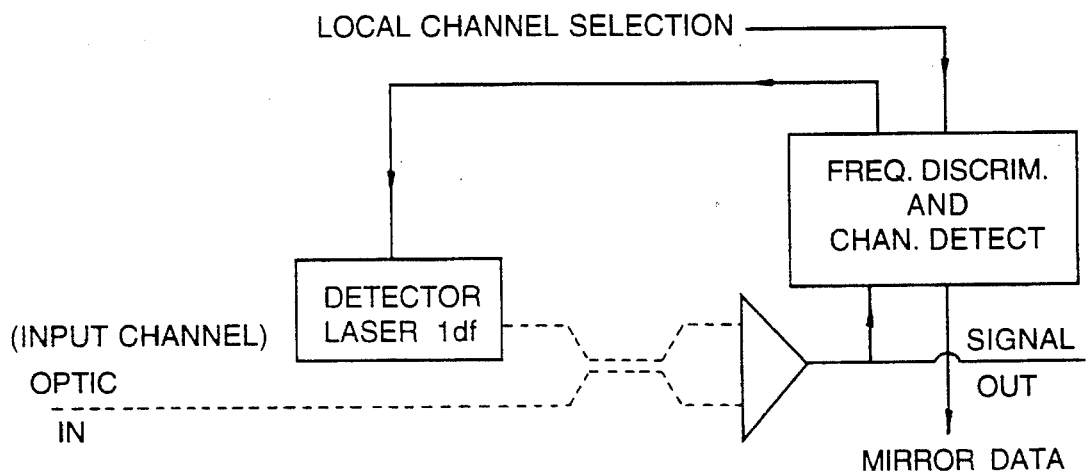

The Subscriber Port unit as shown in FIG. 3I controls its selection of all the distributed optical channels. It has no optical output port.

The Exchange Port units as shown in FIG. 3G can be simpler than the port units on the general switch, as there is no channel to detect from the subscriber. The Exchange Port units are still controlled in a similar way by the use of the Switchable Clock Monitor, Switchable Clock Reference, Broadcast Generator and TDMA Receiver.

The Subscriber Port units are neither directly controlled nor monitored by the central control functions.

A typical arrangement of a 256×256-way passive optic network is shown in FIG. 2F, wherein a single arrangement is appropriate for the general architecture and a double arrangement is appropriate for the Optical Distribution Frame. Other passive optic arrangements could be used.

As shown in FIG. 2G a single arrangement incorporating a 64×1024-way passive optic network is appropriate for the main distribution of TV Broadcast architecture. Other passive optic arrangements could be used.

The principle of the coherent optic switch enables a very high bandwidth capacity single stage switch to be constructed around a passive optic combiner and splitter.

The port units not only terminate the external interfaces but also carry the coherent sources and detectors.

Every coherent source must accurately transmit on the correct coherent channel. Therefore the source laser is tunable over an optic frequency range.

Every coherent detector must know the channel it is expected to select and be able to accurately recover that particular channel signal. By including a channel identity code it is possible for the detectors to ensure they have locked to the correct channel.

Detection is based on the heterodyne technique. A local laser oscillator is tuned until it has a small frequency difference (Intermediate Frequency, IF) to the required channel. By optically mixing the output of the local oscillator and the incoming signal, the required channel can be detected by passing the resultant signal through a filter with a cut-off of twice the IF.

The number of channels is dependent on the spacing of the channels, the width of the tuning range of the local oscillators and the source oscillators, there being enough optical power left at the detector, after the optic combiner and splitter, to discriminate the wanted channel from the rest.

FIG. 2A shows the General Architecture for a Coherent Optic Switch. This switch is capable of being distributed, because there are only internal optic connections to the port units.

It is essential that the source lasers remain stabilised at the correct optical frequencies.

The requirement is that the clock stabilisation of both the coherent sources and the coherent detectors is an integral part of the switch architecture. It is also a requirement that all clock stabilisation information and other control information is carried via the normal internal optic connections to the port units.

A considerable part of the central control functions are dedicated to maintaining channel stabilisation.

This section proposes the channel spacings for the three duplex and two simplex architectures with both relaxed and close spacings. Channel spacing diagrams are provided as well as the block diagrams for the port units. Some details of the central control functions are also provided.

These are for the;
GENERAL ARCHITECTURE
OPTICAL DISTRIBUTION FRAME (DIRECT) ARCHITECTURE
OPTICAL DISTRIBUTION FRAME (MIRROR) ARCHITECTURE There are two arrangements of channel spacings shown;
Relaxed spacings as in FIG. 3A with 1 Reference position per Channel and Close spacings as in FIG. 3B with 1 Reference position per two Channels.

The Broadcast and TDMA channels are not shown as they are outside the tunable coherent frequency band.

The port units are the same for all these three architectures, except that the Subscriber Port unit on the Optical Distribution Frame (Mirror) Architecture does have the broadcast receiver or the TDMA source.

From the Broadcast information (which is not shown in the channel spacing diagrams) the Port unit knows which input channel to detect and what channel it should source.

The fibre from the optic combiner/splitter not only contains all the possible input channels but can also contain some references. The references are of a much narrower bandwidth and are spaced as shown between the broadband channels.

The relaxed Channel spacing diagram, FIG. 3A, shows a channel and a possible reference every 6 df, with a 2 df spacing between the channel and the possible reference.

With one laser, it is possible to detect a reference and to source a channel, 2 df away. However any signal on the channel frequency itself will also be detected. This does not matter if it directly results from the local source laser as this signal can be removed by analogue subtraction. However it must not come from another source, unless the image rejection technique is employed.

Consequently the same optic frequency cannot be used in both optic combiner/splitters in the Optical Distribution Frame Architectures. The advantages of the Optical Distribution Frame architectures are in making better use of the available optical budget, rather than better use of the tuning range.

The detection of channels can still be performed satisfactorily even in the presence of the reference, as a reference is 3 df away from the channel local oscillator frequency.

Provided the optic detectors know whether to tune just above or just below a reference channel, the closer channel spacings can be used, as shown in FIG. 3B. This enables more channels to be packed into a given bandwidth. It also halves the number of references that are required. This gives a usable data channel every 4df.

Each General Port Unit has one fibre connection to, and one fibre connection from, the single optic combiner/splitter, or the pair of optic combiner/splitters.

The General Port Unit, shown in FIG. 3C, contains:

Broadcast receiver;

DMA source for status data;

Detector laser (local oscillator) with frequency discriminator and channel detector;

Source laser (reference local oscillator) with frequency discriminator, channel detector and analogue subtractor;

A frequency control data selector for working with optic reference or broadcast channel;

Channel Identity and Mirror Data multiplexer.

The optical distribution frame (mirror) port unit see FIG. 3D is based on the General Port unit except that it does not contain the Broadcast Receiver or the TDMA source. Consequently it loses two optic couplers and gains some optic budget in each path.

Broadcast information which has been reflected forward at the exchange end arrives via the mirror channel. Status information is returned in the vacant mirror channel in the other direction to the exchange end where it can be inserted into the TDMA mechanism.

Consequently less Broadcast and TDMA equipment is required centrally.

The advantages of this simpler architecture are not dramatic, but it is included as a possible option.

These are for the:

SIMPLEX ARCHITECTURE

TV BROADCAST ARCHITECTURE

There are 2 arrangements of channel spacings shown:

Relaxed spacings with 1 Reference position per Channel (FIG. 3E) and

Close spacings with 1 Reference position per 2 Channels (FIG. 3F).

The Broadcast and TDMA channels are not shown as they are outside the tunable coherent frequency band.

The Exchange Port units are the same for both these architectures, but the Subscriber Port units are different.

From the Broadcast information (which is not shown in the channel spacing diagrams) the Exchange Port unit knows what channel it should source and therefore which reference to detect.

The fibre from the optic splitter contains the references. The references are spaced as shown in FIGS. 3E and 3F, which are the same spacings as the earlier figures. FIG. 3F shows closer spacings, than FIG. 3E, and requires only one reference per 2 channels.

The Simplex and TV Broadcast Exchange Port Unit (FIG. 3G) is basically the same as the General Port unit but without the detector laser (local oscillator) with its frequency discriminator and channel detector.

The Simplex Subscriber Port Unit (FIG. 3H) has the detector laser (local oscillator) with its frequency discriminator and channel detector as well as the TDMA source driving an Optic Out Port for subscriber signalling.

The TV Broadcast Subscriber Port Unit (FIG. 3I) has just the detector laser (local oscillator) with its frequency discriminator and channel detector without the TDMA source and Optic Out Port, as there is no subscriber signalling.

It is essential to have secured optic frequency stabilisation arrangements.

Figure 3J:
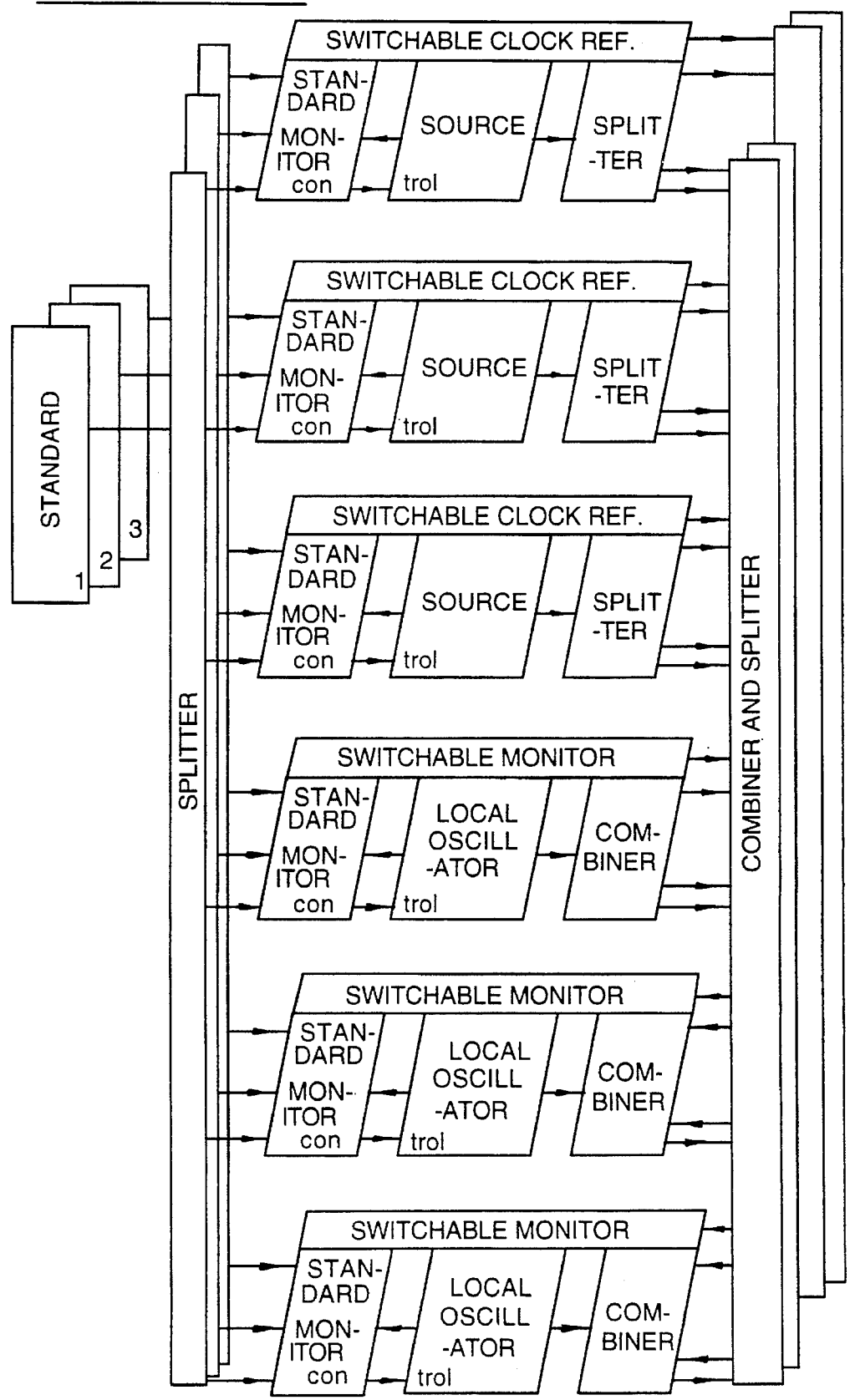
FIG. 3J shows a diagrammatic view of a means of clock stabilisation.

There are at least two optic standards of the same nominal optic frequency. FIG. 3J shows 3 optic standards.

There must be at least two switchable clock references. FIGS. 3.8 shows 3 switchable clock references.

Each switchable reference clock is connected to all the optic standards.

Each switchable clock reference is connected to some or all the main switch optic combiner and splitter units so that it can supply a reference to some or all of the port unit sources.

A switchable clock reference consists of 3 parts:

an optic standard monitor;

a tunable laser source (the same as those on port units);

a normal passive optic splitter.

There must be at least two switchable clock monitors. FIG. 3J shows 3 switchable clock monitors.

Each switchable clock monitor is connected to all the optic standards.

Each switchable clock monitor is connected to some or all the main switch optic combiner and splitter units so that it can monitor some or all of the port unit sources.

A switchable clock monitor consists of 3 parts:

an optic standard monitor;

a tunable laser local oscillator (the same as those on port units);

a normal passive optic combiner.

The outputs of the Optic Frequency Standards are taken via passive optic splitters to all the standard optic monitor units.

The standard optic monitor units compare the standards to see if any appear faulty and help decided which optic standard is the current worker (in conjuction with the master control unit which is not shown in FIG. 3J).

A standard optic monitor controls the laser source, of a switchable clock reference unit, so that it supplies an accurate reference. Only when it has confirmed that the source is at the correct optic frequency will it permit the reference identity code to be added and the source output enabled into the passive optic network.

A standard optic monitor also controls the local oscillator of the switchable monitor, by supplying the channel code that the local oscillator must search for. When the local oscillator is receiving the required channel the optic monitor compares the optic frequency of the local oscillator with the worker optic frequency standard. Any adjustments required are determined and a broadcast message is requested to be sent out to the port unit.

One of the key features of a practical switch is that it must be easy to grow. The coherent architectures described have very efficient growth characteristics.

Once the 16 by 16 optic combiner/splitters have been provided, along with the central control functions, port units can be added as required with the necessary 1 to 4 splitters and 4 to 1 combiners.

If a larger switch requires more switchable clock references or switchable monitors, they can be added as required via simple optic connections.

The central secured microprocessor controllers, which have not been described herein, have to be able to handle all the standard optic monitor units, the broadcast Generators and the TDMA receivers, perhaps 16 in total for a large secured switch. The number of channels to be handled is small compared with System X switches.

Unlike electronic switching, there are no active components in the switching core, consequently the growth characteristics for coherent optic switches should always be very good. However the use of optic amplifiers would introduce active components, within the combining and splitting networks, and negate the benefits of a passive switching core.

Coherent optic switches should not do time switching. Therefore the requirements for frame synchronisation do not exist. A TDMA message frame synchronisation is required for the control architecture described.

However a port unit even if it does not have a live external interface should still generate some form of payload to carry across the switch in order to demonstrate that it is working satisfactorily. It is also necessary to substitute a payload when a temporary loss of external input occurs. A form of substitute clock is required for each port unit. The changeover from a line clock to a substitute clock and the converse can cause discontinuites. Therefore the external line clock should be used to synthesise a smooth modulation clock of slightly higher frequency. This modulation clock should naturally hold the synthesised frequency in order to minimise (or eliminate) any discontinuity if the external line clock is lost and returns promptly.

The plane clock selection mechanism will also need some similar characteristics to the substitute clock described in standby port unit clocks above.

Security was briefly mentioned earlier.

Because the core of the switch, used to carry the traffic, is totally passive the reliability can be considered to be very high. The control core can be secured as shown in FIG. 3J.

The weak links are the port units and the fibres of a very distributed architectures.

Two plane internal architectures are relatively straight forward. However cable lengths will have to be matched between the planes if hit-less change-overs are required at the plane selection before the external transmission interface.

The plane clock selection mechanism, on the port units prior to driving the external line, will also need some similar characteristics to the substitute clock described in the standby port unit clocks above.

One of the attractive features of the Optical Distribution Frame application, is the ease with which a replacement exchange port unit can be configured in to replace a failed exchange port unit and thereby return the service to the subscriber. This requires the external interface, to the replacement exchange port unit, to be accepted by the service network as the subscriber interface.

The precise positioning of the optic channels can be redefined if necessary even on an in service coherent switch.

There are some advantages in this flexibility.

Firstly, if a particular port unit is transmitting on the wrong channel and it cannot be inhibited, this may mean that it interferes with another one or two channels. It is possible to not use the affected channel and command the port units to use other vacant channels.

Secondly, it is worth leaving several channels unused at each end of the tuning range. It is necessary to know that a unit can work over the full range of optic channel frequencies. When testing a new, or out of service port unit, it should be asked to source and detect on a channel at one end and then on a channel at the other end of the tuning range. If the unit is not working accurately it should not risk interfering with a channel as there would be no adjacent ones in service.

Optic Amplifers are already becoming every effective at some optic frequencies and will probably become effective at the optic frequencies suggested later. Including optic amplifiers obviously degrades the reliability of the passive optic core, as it would no longer be passive. Optic amplifiers would only be of benefit if added close to the 16 by 16 optic combiner/splitters.

It is possible to consider their inclusion to improve the optical budget on very distributed applications. However the sizes of the architectures described do not need optic amplifiers.

They can be considered in the longer term as being another technique which will keep optic technology well ahead of electrical transmission technology.

There are two major interfaces to consider. The External Line Interface and the Passive Interface.

The Passive Interface is the interface between the port units and the passive optic combiner/splitter.

A particular switch has a particular channel separation and switches a particular circuit bit rate.

For convenience, the coherent optic switch carries circuits which are clocked data streams of nominally the same bit rate.

The clocks for the data streams carried across the passive interface are normally derived from the incoming external line clocks.

The information content, of the switched circuit sent from the Port Unit across the Passive Interface, will consist of the following:

Circuit Framing Alignment Signal:

Channel Identity Code;

Circuit Data;

Stuffing;

Error Detecting or Correcting Codes.

When a lower bit rate circuit interface is required to be transported across a higher circuit rate coherent switch, then fixed tuffing is used to fill the excess bandwidth. Alternatively, where a switch of a fixed granularity is required to carry lower bit rate channels than it was designed for, (e.g. 155 instead of 622 Mbit/s) then one source could be used to carry four quarter size payloads. A detector would have to discard three quarters of the total payload. In which case it may be appropriate to have 4 such detectors for each quad source.

The coherent optic switch must be able to interpret the channel Identity Code. This will involve the decoding of the Frame Alignment Signal.

The coherent optic arrangements do not need to be aware of the circuit data, stuffing or error detecting/correcting information. The external line interface area of the port unit of course does.

The External Line Interface does not have to be SDH based. It could be another coherent network or a digital TV signal or a high order PDH signal.

The Line Interface is often likely to be an SDH STM-4 622 Mbit/s signal. It could also be a STM-1, 155.52 Mbit/s signal, or an STM-16, 2.5 Gbit/s signal. The coherent channel spacing would be different for the different line rates, if the maximum number of ports is to be achieved for each line rate.

Because of the need for a substitute clock in the event of the loss of the external line signal, some frequency synthesis will be required on most types of the port unit. However a method of keeping the Passive Interface Data Rate the same as the External Line Interfaces data rate has been proposed and is included below. Some applications, such as an SDH crossconnect, should not switch all the section overhead and this method may be appropriate.

The method described modifies part of the SDH Section Overhead.

SDH carriers have a known Frame Alignment Signal, the rest is nearly all scrambled.

The Normal Frame Alignment Signal is 6 bytes for an STM-1; A1,A1,A1,A2,A2,A2.

It is 24 bytes for an STM-4; A1,A1,A1,A1,A1,A1,A1,A1, A1,A1,A1,A1,A2,A2,A2,A2,A2,A2,A2,A2,A2,A2,A2, A2, Four STM-1s are byte interleaved to form an STM-4.

A1 is 11110110 and A2 is 00101000.

It is proposed to keep the A1 pattern the same and change the A2 pattern. The A2 pattern should still only have 2 bits at logic 1.

It is suggested that the 3 off A2 bytes are replaced by bytes X, Y and Z.

The 16 suggested patterns for X, Y and Z are:

10100000
10010000
10001000
10000100
01010000
01001000
01000100
01000010
00100100
00100010
00100001
00010010
00010001
00001010
00001001
00000101

The total combinations for X, Y and Z are 4096.

The STM-1 frame alignment pattern becomes A1,A1,A1, X, Y, Z.

The STM-4 frame alignment pattern becomes A1,A1,A1, A1,A1, A1,A1,A1,A1,A1,A1, X, X, X, X, Y, Y, Y, Z, Z, Z, Z.

The port unit overwrites the A2 bytes received from the external line interface and replaces them with the appropriate X, Y and Z bytes which are then sent over the passive interface to the optic combiner and splitter. When there is no line signal the substitute STM-1 is used and the A2 bytes are similarly overwritten. Changing from the substitute to the restored external line input may cause a transient loss of frame alignment to be output to the external interface, if the substitute has been used other than to cover a short transient.

The port unit also overwrites the X, Y and Z bytes received from the passive interface and replaces them with A2 bytes to send out over the external line interface.

Use of Erbium Doped optical Fibre Amplifiers (EDFA) in coherent based systems offers significant increases in the available optical budget. This might be useful in some applications of coherent based optical switches. This improvement in the optical budget could allow an increased number of channels to be supported. This is especially significant in systems which require high data rates (STM-16).

The optical bandwidth of EDFA's is limited to 30 nm in the 1530–1565 nm region. This limits the usable wavelength range of the switch and could restrict the number of channels.

The cost of the optical amplifier would be shared amongst the transmitter units it serviced. For a fully cross-connected switch an optical amplifier would have to serve each transmitter making it an expensive proposition. For a delta-two network the cost would be shared amongst all the transmitters. However, due to the increased loss of this network topology the optical budget gained would be reduced. The exact cost and effectiveness of a EDFA is therefore strongly dependent on the Passive Optical Network (PON) configuration used and its placement within the PON network.

Figure 4A:
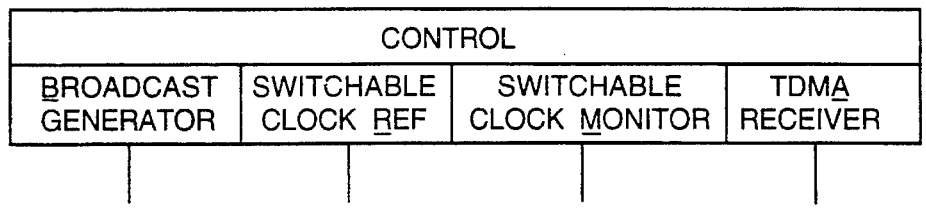
FIG. 4A shows a diagrammatic representation of a optic switch control unit.

The control unit as shown in FIG. 4A is used in coherent based broadband connection systems and consists of 4 sections:

i) Broadcast Generator.

ii) Switchable Clock monitor.

iii) TDMA receiver.

iv) Switchable Clock reference.

i) The broadcast generator supports both the passing-on of the optical switch routing requests to the coherent based receivers and frequency correction information for the coherent transmitters. This system is based on direction and would use a wavelength in the 1.3 micrometers range or at a distance several nanometers lower than the coherent comb of optical frequencies.

1.3 micrometers is recommended to allow easy implementation of this unit avoiding the requirement of complex optical filtering to remove a 1.5 micrometers direct signal from the 1.5 micrometers coherent channels.

ii) The Switchable Clock monitor unit measures the optical frequency of each coherent source. This is achieved by the use of a Scanning Heterodyne Spectrometer (S.H.S.) calibrated by the use of two highly stable optical references. For large port count systems the use of several S.H.S would allow a smaller wavelength region to be covered by each S.H.S. This would still maintain the level of stability required for each coherent source. The frequency correction information is passed to the coherent sources by the Broadcast Generator detailed above.

(iii) The TDMA receiver accepts Time Division data being sent by the port units to the control unit. This unit is based on the direct detection system as in the broadcast channel unit but uses a different wavelength (preferably within the 1.3 micrometers region).

The suggested wavelengths for the broadcast and TDMA channels are 1280 micrometers and 1320 micrometers.

(iv) The Switchable Clock Reference.

Figure 4B:
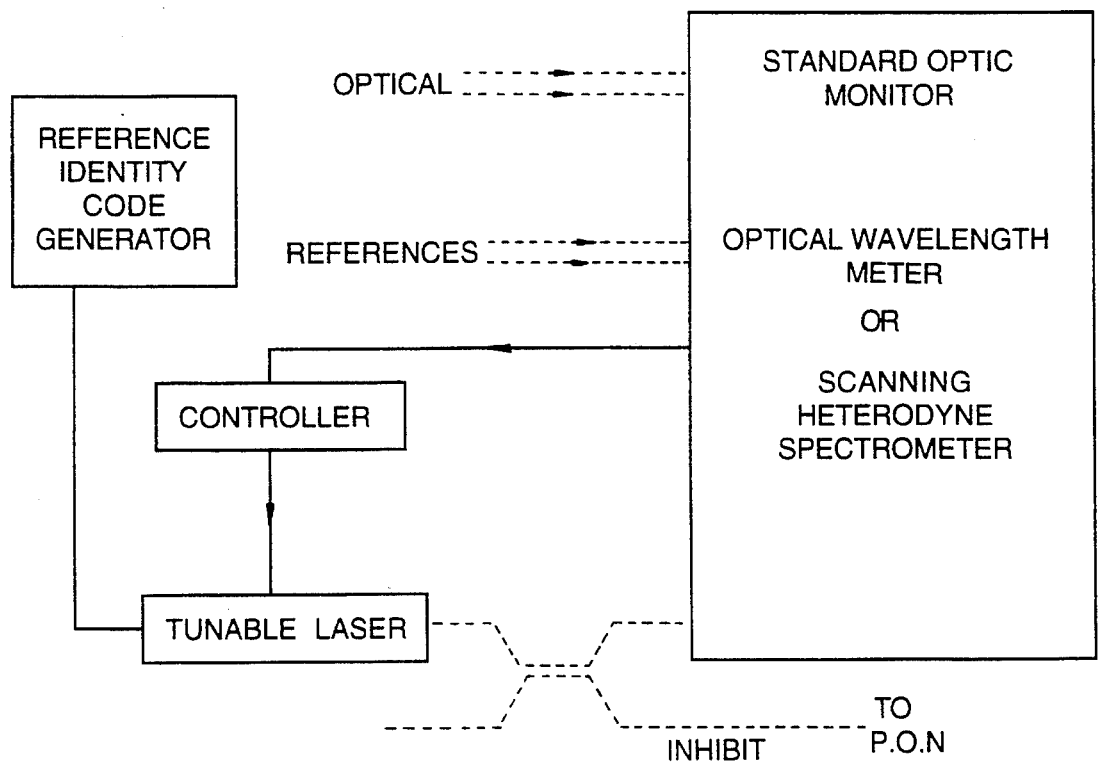
FIG. 4B shows a diagrammatic representation of a switchable clock reference.

The Switchable Clock Reference as shown in FIG. 4B would consist of a tunable laser, the optical frequency of which is monitored and stabilised by the use of either an optical wavelength meter or a Scanning Heterodyne Spectrometer (S.H.S). In the case of the S.H.S option additional optical references would be required to calibrate the S.H.S's scan range. The optical wavelength meter relies on an intenal Helium-Neon Laser to supply its own optical reference.

The Switchable Clock Reference is modulated by a low data rate signal consisting of a unique reference identity code to inform which port unit is to 'lock' to this switchable clock reference.

The use of the Switchable Clock Reference is by tuning to the required optical reference position, adding the reference identity code and enabling it into the passive optic distribution. The required coherent transmitter, within the port unit, corrects its optical frequency, maintaining the required frequency offset from the switchable clock reference, by the use of heterodyne Automatic Frequency Control. This results in the coherent source being positioned at the required optical frequency position within the optic comb. The identity code of the Optical Switchable Clock Reference is removed if it indicates to the coherent source that the reference is to be removed. From this point the coherent source relies solely on the optical frequency correction information being sent to it from the control unit via the broadcast channel to maintain stabilisation.

For large port count systems the use of several Switchable Clock References, covering a part of the total system optical bandwidth used, allows several coherent sources to be simultaneously started up. This reduces the time for a complete system start up.

We claim:

1. A broadband multiport coherent optic data switch, comprising: a plurality of port units each having inputs and outputs, one output of each port unit being connected to a respective input of a passive optic combiner/splitter; a switch control unit connected to the combiner/splitter; each port unit having a coherent optic source tuned to a respective optic frequency; each source having an output carrying control information, including control information received from the switch control unit, together with switched data; the outputs of the sources being combined by the combiner/splitter and distributed to all of the plurality of port units; and a further plurality of port units, each having an optic source having an output not carrying switched data.

2. An optic switch as claimed in claim 1, wherein each source includes control means to tune the source to a tuned switchable reference frequency received from the switch control unit via one of the combiner/splitter, a further combiner/splitter, a combiner, and a splitter.

3. An optic switch as claimed in claim 2, the switch control unit comprising a monitor unit, the monitor unit providing information whereby the frequency of a source is corrected.

4. An optic switch as claimed in claim 1, wherein at least one of the port units has a broadcast receiver and wherein the control information is transmitted optically via an outband optic broadcast channel to such of the port units as have a broadcast receiver.

5. An optic switch as claimed in claim 4, wherein the port units include a relay unit to relay the control information via a respective port unit optic channel to port units not having a broadcast receiver.

6. An optic switch as claimed in claim 4, wherein the control information includes information identifying the respective optic frequency.

7. An optic switch as claimed in claim 1, including a Time Division Multiplex Access (TDMA) source for status data, which data is transmitted via a further outband optic channel.

8. An optic switch as claimed in claim 1, wherein the coherent optic sources are laser sources.

* * * * *